(12) United States Patent
Yamada et al.

(10) Patent No.: US 8,463,019 B2
(45) Date of Patent: Jun. 11, 2013

(54) PSEUDO 3D IMAGE GENERATION DEVICE, IMAGE ENCODING DEVICE, IMAGE ENCODING METHOD, IMAGE TRANSMISSION METHOD, IMAGE DECODING DEVICE, AND IMAGE DECODING METHOD

(75) Inventors: Kunio Yamada, Kanagawa-ken (JP); Hiroya Nakamura, Kanagawa-ken (JP); Masahito Sato, Kanagawa-ken (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 1329 days.

(21) Appl. No.: 12/219,327

(22) Filed: Jul. 18, 2008

(65) Prior Publication Data

US 2009/0041339 A1 Feb. 12, 2009

(30) Foreign Application Priority Data

Jul. 19, 2007 (JP) ................................ P2007-187824
May 30, 2008 (JP) ................................ P2008-142434

(51) Int. Cl.
*G06K 9/00* (2006.01)
*G06T 15/00* (2011.01)

(52) U.S. Cl.
USPC .......................................... 382/154; 345/419

(58) Field of Classification Search
USPC ........................................ 345/419; 382/154
See application file for complete search history.

(56) References Cited

U.S. PATENT DOCUMENTS

2006/0061569 A1 * 3/2006 Yamada ........................ 345/422

FOREIGN PATENT DOCUMENTS

JP 2000-078611 A 3/2000
JP 2005-151534 6/2005

OTHER PUBLICATIONS

The Journal of the Institute of Image Information and Television Engineers, vol. 56, No. 5, pp. 863-866, (2002) with English Translation.

* cited by examiner

*Primary Examiner* — Anand Bhatnagar
*Assistant Examiner* — Soo Park
(74) *Attorney, Agent, or Firm* — Nath, Goldberg & Meyer; Jerald L. Meyer; Sanjana Mangalagiri

(57) ABSTRACT

A pseudo 3D image generation device includes frame memories that store a plurality of basic depth models used for estimating depth data based on a non-3D image signal and generating a pseudo 3D image signal; a depth model combination unit that combines the plurality of basic depth models for generating a composite depth model based on a control signal indicating composite percentages for combining the plurality of basic depth models; an addition unit that generates depth estimation data from the non-3D image signal and the composite depth models; and a texture shift unit that shifts the texture of the non-3D image for generating the pseudo 3D image signal.

1 Claim, 15 Drawing Sheets

FIG. 6

| user_data ( ) { | No. of bits |
|---|---|
| user_data_start_code | 32 |
| associate_3d_parameter_identifier | 32 |
| ctl1_enable | 1 |
| if (ctl1_enable){ | |
| blending_parameter 1_1 | 8 |
| blending_parameter 1_2 | 8 |
| } | |
| ctl2_enable | 1 |
| if (ctl2_enable){ | |
| blending_parameter 2 | 8 |
| } | |
| ctl3_enable | 1 |
| if (ctl3_enable){ | |
| shift_adjust_parameter 1 | 8 |
| shift_adjust_parameter 2 | 8 |
| } | |
| next_start_code | |
| } | |

FIG. 13

| user_data_unregistered (payloadSize) { | No. of bits |
|---|---|
| uuid_iso_iec_11578 | 128 |
| ctl1_enable | 1 |
| if (ctl1_enable){ | |
| blending_parameter 1_1 | 8 |
| blending_parameter 1_2 | 8 |
| } | |
| ctl2_enable | 1 |
| if (ctl2_enable){ | |
| blending_parameter 2 | 8 |
| } | |
| ctl3_enable | 1 |
| if (ctl3_enable){ | |
| shift_adjust_parameter 1 | 8 |
| shift_adjust_parameter 2 | 8 |
| } | |
| } | |

FIG. 16

| PES_packet ( ) { | No. of bits |
|---|---|
| ≈ | ≈ |
| PES_extension_flag | 1 |
| ≈ | ≈ |
| if (PES_extension_flag == '1') { | |
| PES_private_data_flag | 1 |
| pack_header_field_flag | 1 |
| program_packet_sequence_counter_flag | 1 |
| P-STD_buffer_flag | 1 |
| reserved | 3 |
| } | |
| PES_extension_flag 2 | 1 |
| if (PES_private_data_flag == '1') { | |
| associate_3d_parameter_identifier | 32 |
| ctl1_enable | 1 |
| if (ctl1_enable){ | |
| blending_parameter 1_1 | 8 |
| blending_parameter 1_2 | 8 |
| } | |
| ctl2_enable | 1 |
| if (ctl2_enable){ | |
| blending_parameter 2 | 8 |
| } | |
| ctl3_enable | 1 |
| if (ctl3_enable){ | |
| shift_adjust_parameter 1 | 8 |
| shift_adjust_parameter 2 | 8 |
| } | |
| stuffing_bits | 53-93 |
| } | |
| ≈ | ≈ |
| } | |

FIG. 18

| adaptation _ field ( ) { | No. of bits |
|---|---|
| adaptation _ field _ length | 8 |
| if (adaptation _ field _ length > 0){ | |
| ≈ | ≈ |
| transport _ private _ data _ flag | 1 |
| ≈ | ≈ |
| if (transport _ private _ data _ flag == '1'){ | |
| transport _ private _ data _ length | 8 |
| associate _ 3d _ parameter _ identifier | 32 |
| ctl1 _ enable | 1 |
| if (ctl1 _ enable){ | |
| blending _ parameter 1 _ 1 | 8 |
| blending _ parameter 1 _ 2 | 8 |
| } | |
| ctl2 _ enable | 1 |
| if (ctl2 _ enable){ | |
| blending _ parameter 2 | 8 |
| } | |
| ctl3 _ enable | 1 |
| if (ctl3 _ enable){ | |
| shift _ adjust _ parameter 1 | 8 |
| shift _ adjust _ parameter 2 | 8 |
| } | |
| stuffing _ bits | 0-7 |
| } | |
| ≈ | ≈ |
| } | |

FIG. 19

| Channel allocation information | No. of channels |
|---|---|
| 000 | Monaural |
| 001 | 2ch |
| 010 | 4ch |
| 011 | 6ch |
| 100 | 8ch |
| 101 | 16ch |
| 110 | 32ch |

…

PSEUDO 3D IMAGE GENERATION DEVICE, IMAGE ENCODING DEVICE, IMAGE ENCODING METHOD, IMAGE TRANSMISSION METHOD, IMAGE DECODING DEVICE, AND IMAGE DECODING METHOD

BACKGROUND OF THE INVENTION

1. Field of the Invention

The present invention relates to a pseudo 3D image generation device, an image encoding device, an image encoding method, an image transmission method, an image decoding device, and an image decoding method for generating a pseudo 3D image from a non-3D image.

2. Description of the Related Art

Many 3D display systems have been introduced that generate a pseudo 3D image from a two-dimensional still image or moving image (hereinafter called a non-3D image) to which depth information is given neither explicitly nor, as for a stereo image, implicitly.

The applicant of the present invention disclosed a pseudo 3D image generation device and a pseudo 3D image generation method for generating a pseudo 3D image from a non-3D image in Japanese Patent Laid-Open Publication No. 2005-151534. The pseudo 3D image generation device and generation method, described in Japanese Patent Laid-Open Publication No. 2005-151534, provide multiple images having a depth effect (hereinafter called basic depth models), calculate the high-brightness components of the brightness signals on one screen of a non-3D image and, based on the calculated value, automatically calculate the composite percentages of the multiple basic depth models. Based on the calculated composite percentages, the disclosed device and method estimate depth data for achieving the depth effect of a non-3D image and produce a pseudo 3D image using the non-3D image and the estimated depth data.

The problem with the pseudo 3D image generation device and the pseudo 3D image generation method described above is that the composite percentages of multiple basic depth models is calculated for all non-3D images automatically by the same predetermined method. So, depending upon the scene of a non-3D image (hereinafter called a scene) that is displayed one screen at a time, the disclosed device and method do not produce appropriate depth information sometimes with the result that an unnatural pseudo 3D image is generated. Meanwhile, it is actually difficult for the user to adjust the algorithm or the parameters of a pseudo 3D image for each non-3D image scene. Therefore, to generate a pseudo 3D image that is natural and closer to the actual image, it is desirable that a producer adjusts parameters.

SUMMARY OF THE INVENTION

In view of the foregoing, it is an object of the present invention to provide a pseudo 3D image generation device, an image encoding device, an image encoding method, an image transmission method, an image decoding device, and an image decoding method that allow the depth information, which is estimated by an automatic processing method, to be corrected according to a scene when the above-described pseudo 3D image is generated.

To solve the problem with the conventional technology described above, the present invention provided a pseudo 3D image generation device, an image encoding device, an image encoding method, an image transmission method, an image decoding device, and an image decoding method.

A pseudo 3D image generation device (52) comprises basic depth model generation units (77-79) that generate a plurality of basic depth models having basic scenes used for estimating depth data based on a non-3D image signal and generating a pseudo 3D image signal; a combination unit (76) that combines the plurality of basic depth models for generating a composite depth model based on a first control signal indicating composite percentages for combining the plurality of basic depth models; a depth estimation data generation unit (82) that generates the depth estimation data from the non-3D image signal and the composite depth models; and a texture shift unit (92) that shifts a texture of a non-3D image based on the depth estimation data for generating the pseudo 3D image signal.

The pseudo 3D image generation device further comprises a weighting unit (81) that multiplies the non-3D image signal by a weighting coefficient based on a second control signal indicating the weighting coefficient for putting a weight on the non-3D image signal wherein the texture shift unit shifts the texture of the non-3D image, based on a multiplication result obtained from the weighting unit and on the depth estimation data, for generating the pseudo 3D image signal.

The pseudo 3D image generation device is a device wherein the texture shift unit shifts the texture of the non-3D image for generating the pseudo 3D image signal based on the depth estimation data adjusted by a third control signal indicating a depth and a convergence for adjusting the depth data.

The pseudo 3D image generation device further comprises first to third determination units (75, 80, 91) that determine whether the first to third control signals are present wherein if the first determination unit determines that the first control signal is not present, the combination unit generates the composite depth model based on pre-set composite percentages, if the second determination unit determines that the second control signal is not present, the weighting unit puts a weight on the non-3D image signal based on a pre-set weighting coefficient and if the third determination unit determines that the third control signal is not present, the texture shift unit generates the pseudo 3D image signal based on pre-set values indicating a depth and a convergence.

The pseudo 3D image generation device further comprises a disocclusion unit that (93), for the pseudo 3D image signal generated by the texture shift unit, disoccludes an occlusion, where there is no texture, using a corresponding part of the non-3D image signal; and a post-processing unit (94) that performs post-processing for a pseudo 3D image signal disoccluded by the disocclusion unit, and outputs an image signal having a viewpoint different from a viewpoint of the non-3D image signal.

An image encoding device (1) comprises an image signal encoding unit (13) that encodes a non-3D image signal; a control signal encoding unit (12) that encodes at least one of a first control signal, a second control signal, and a third control signal, the first control signal indicating composite percentages for combining a plurality of basic depth models having basic scenes used for estimating depth data based on a non-3D image signal and generating a pseudo 3D image, the second control signal indicating a weighting coefficient for putting a weight on the non-3D image signal, the third control signal indicating a depth and a convergence for adjusting the depth estimation data; and a multiplexing unit (14) that multiplexes a non-3D image signal encoded by the image signal encoding unit and control signals encoded by the control signal encoding unit for generating an encoded bit string.

An image encoding method comprises an image signal encoding step of encoding a non-3D image signal; a control signal encoding step of encoding at least one of a first control signal, a second control signal, and a third control signal, the first control signal indicating composite percentages for combining a plurality of basic depth models having basic scenes used for estimating depth data based on a non-3D image signal and generating a pseudo 3D image, the second control signal indicating a weighting coefficient for putting a weight on the non-3D image signal, the third control signal indicating a depth and a convergence for adjusting the depth estimation data; and a multiplexing step of multiplexing a non-3D image signal encoded by the image signal encoding step and control signals encoded by the control signal encoding step for generating an encoded bit string.

An image transmission method comprises an image signal encoding step of encoding a non-3D image signal; a control signal encoding step of encoding at least one of a first control signal, a second control signal, and a third control signal, the first control signal indicating composite percentages for combining a plurality of basic depth models having basic scenes used for estimating depth data based on a non-3D image signal and generating a pseudo 3D image, the second control signal indicating a weighting coefficient for putting a weight on the non-3D image signal, the third control signal indicating a depth and a convergence for adjusting the depth estimation data; and a packetizing step of packetizing a non-3D image signal encoded by the image signal encoding step and an encoded bit string comprising control signals encoded by the control signal encoding step.

An image decoding device (51) comprises a separation unit (61) that separates and outputs control signals and a non-3D image signal from an encoded bit string including the non-3D image signal and at least one of a first control signal, a second control signal, and a third control signal, the first control signal indicating composite percentages for combining a plurality of basic depth models having basic scenes used for estimating depth data based on a non-3D image signal and generating a pseudo 3D image, the second control signal indicating a weighting coefficient for putting a weight on the non-3D image signal, the third control signal indicating a depth and a convergence for adjusting the depth estimation data; and decoding units (62, 63) that decode the control signals and the non-3D image signal.

An image decoding method comprises a separation step of separating and outputting control signals and a non-3D image signal from an encoded bit string including the non-3D image signal and at least one of a first control signal, a second control signal, and a third control signal, the first control signal indicating composite percentages for combining a plurality of basic depth models having basic scenes used for estimating depth data based on a non-3D image signal and generating a pseudo 3D image, the second control signal indicating a weighting coefficient for putting a weight on the non-3D image signal, the third control signal indicating a depth and a convergence for adjusting the depth estimation data; and a decoding step of decoding the control signals and the non-3D image signal.

The pseudo 3D image generation device of the present invention allows the control signals to be changed for each screen when depth data is estimated from a non-3D image for generating a pseudo 3D image, thus making it possible to generate a pseudo 3D image that is natural and closer to an actual image for any scene of a non-3D image. The image encoding device, the image encoding method, and the image transmission method of the present invention encode both control signals and image signals. The image decoding device and the image decoding method of the present invention can separate control signals and image signals for decoding each of them.

The nature, principle and utility of the invention will become more apparent from the following detailed description when read in conjunction with the accompanying drawings.

BRIEF DESCRIPTION OF THE DRAWINGS

In the accompanying drawings:

FIG. 6 is a diagram showing an example of the function for encoding control signals in the MPEG-2 image encoding standard in the first embodiment;

FIG. 13 is a diagram showing an example of the function for encoding control signals in the H.264/AVC image encoding method in the second embodiment;

FIG. 16 is a diagram showing an example of the function for encoding control signals in the MPEG-2 system standard in the third embodiment;

FIG. 18 is a diagram showing an example of the function for encoding control signals in the MPEG-2 system standard in the fourth embodiment; and FIG. 19 is a diagram showing an example of audio signal channel allocation in the fourth embodiment.

DESCRIPTION OF THE PREFERRED EMBODIMENTS

First Embodiment

Figure 1:
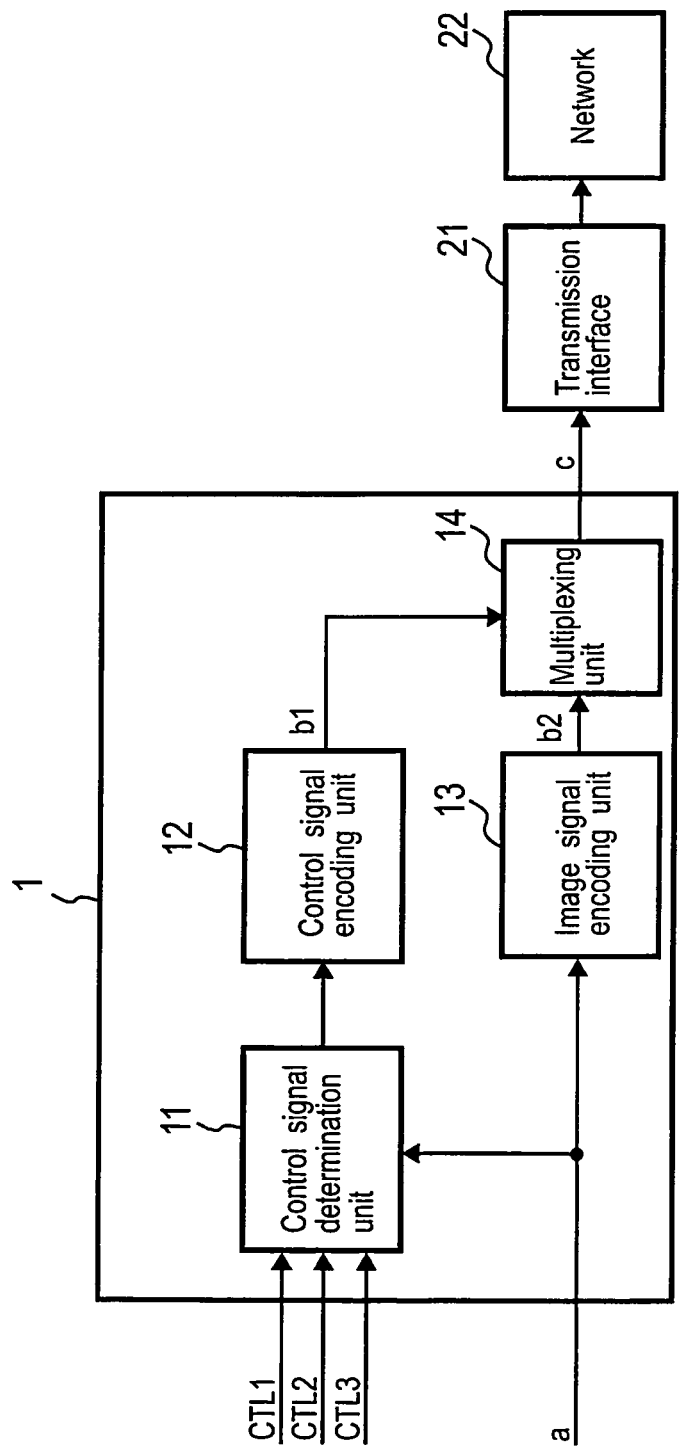
FIG. 1 is a block diagram showing an example of the configuration of an image encoding device in first and second embodiments.

The encoding of non-3D image signals for generating the pseudo 3D image signal in a first embodiment will be described with reference to FIG. 1 to FIG. 11. FIG. 1 is a block diagram showing an example of the configuration of an image encoding device. As shown in FIG. 1, an image encoding device 1 comprises a control signal determination unit 11, a control signal encoding unit 12, an image signal encoding unit 13, and a multiplexing unit 14.

A non-3D image signal a to which the depth information is given neither explicitly nor, as for a stereo image, implicitly is supplied to the image signal encoding unit 13. Control signals CTL1-CTL3 are supplied to the control signal determination unit 11. The presence or absence of the control signals CTL1-CTL3, as well as the values of the parameters included in the control signals CTL1-CTL3, are determined by the producer for each one frame or each one field when a pseudo 3D image, obtained when there is no control signal, looks unnatural. Note that one frame is used in the description of this embodiment.

The control signal CTL1 is a signal that controls the composite percentages of basic depth models. Basic depth models are images having a depth effect such as those shown in FIG. 2-FIG. 4. The basic depth model A shown in FIG. 2 has a concave sphere surface both at the top and at the bottom of the image. The basic depth model B shown in FIG. 3 has a cylindrical surface at the top of the image with the vertical-direction axis line and a concave sphere surface at the bottom of the image. The basic depth model C shown in FIG. 4 has a flat surface at the top of the image and a cylindrical surface at the bottom of the image with the horizontal-direction axis line.

Figure 2:
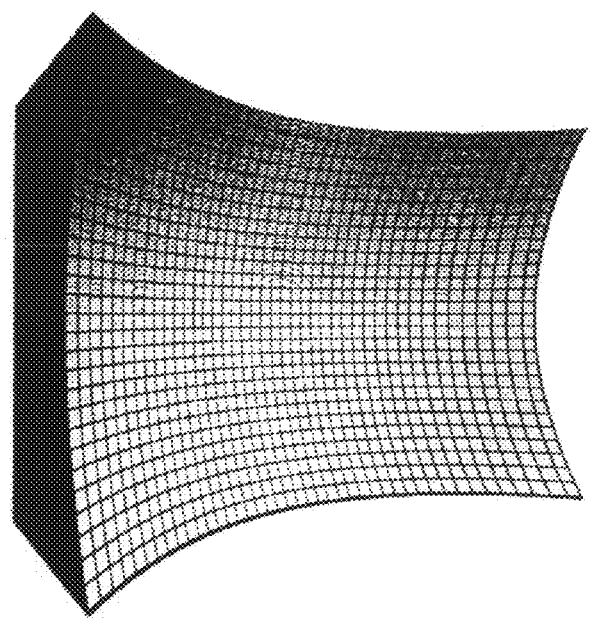
FIG. 2 is a diagram showing an example of the image of a basic depth model.
Figure 3:
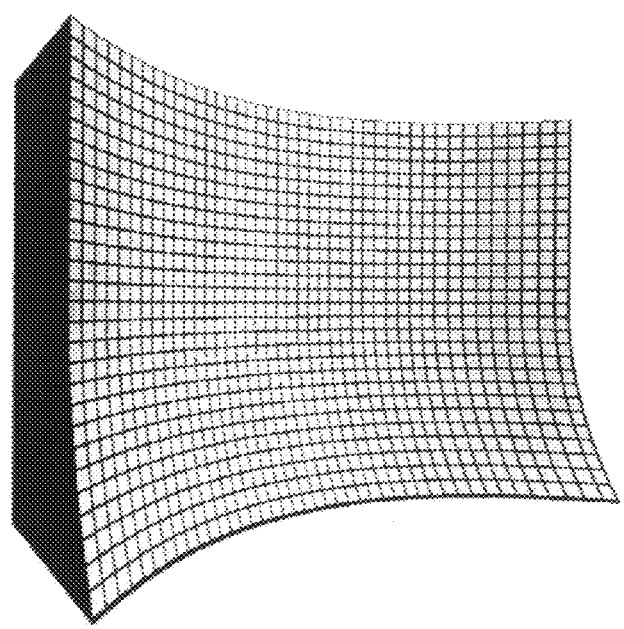
FIG. 3 is a diagram showing another example of the image of a basic depth model.
Figure 4:
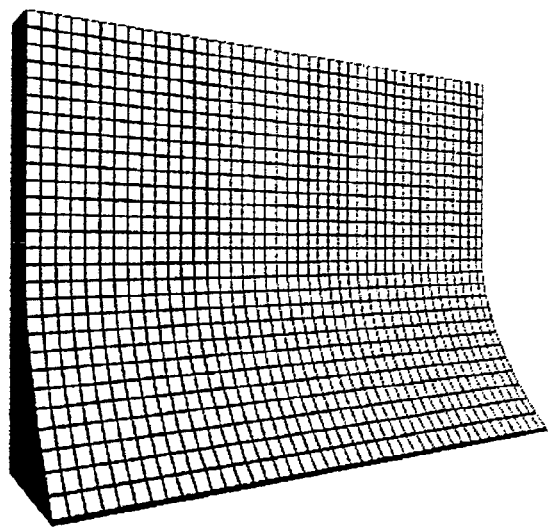
FIG. 4 is a diagram showing a still another example of the image of a basic depth model.

Although the three types of basic depth models shown in FIG. 2 to FIG. 4 are combined in this embodiment, the shapes of basic depth models are not limited to those described above but two types or four or more types of basic depth models may also be used.

The composite percentages of the three types of basic depth models are made variable by changing the parameter values of the control signal CTL1 according to the scene of a non-3D image. Changing the composite percentages of the three types of basic depth models according to the scene of a non-3D image can produce a pseudo 3D image more appropriate to the scene of a non-3D image than a pseudo 3D image produced in the conventional method. The control signal CTL1 includes a parameter, generated by converting the composite percentage k1 of the basic depth model A to a predetermined value, and a parameter generated by converting the composite percentage k2 of the basic depth model B to a predetermined value. Each parameter is represented in eight bits. The total of composite percentages k1, k2, and k3 is 1 where k3 is the composite percentage of the basic depth model C.

The control signal CTL2 is a control signal indicating the weighting coefficient used to put a weight on the R signal component of the non-3D image signal a. This control signal includes one eight-bit parameter. The R signal component is extracted from the three-primary-color signal (RGB signal) acquired from a non-3D image signal. The control signal CTL2 prevents an unnatural pseudo 3D image from being generated even when there is a great difference in the brightness of the non-3D image signal a received by the image signal encoding unit 13.

The control signal CTL3 includes a parameter indicating a depth and a parameter indicating a convergence. Each of those parameters is represented in eight bits. The convergence is an eyes' ability to make the visual lines of both eyes almost parallel for a distant view and to turn both eyes inward for a close view.

In FIG. 1, in synchronization with the non-3D image signal a of one frame, the control signal determination unit 11 determines whether the supplied control signals CTL1-CTL3 are present. The control signal determination unit 11 sends the determination result, which indicates whether the control signals CTL1-CTL3 are present, and the parameter values included in the control signals CTL1-CTL3 to the control signal encoding unit 12. The control signal encoding unit 12 uses the image encoding method, similar to that used by the image signal encoding unit 13 that will be described later, to encode the control signals indicated as present by the determination result.

Figure 5:
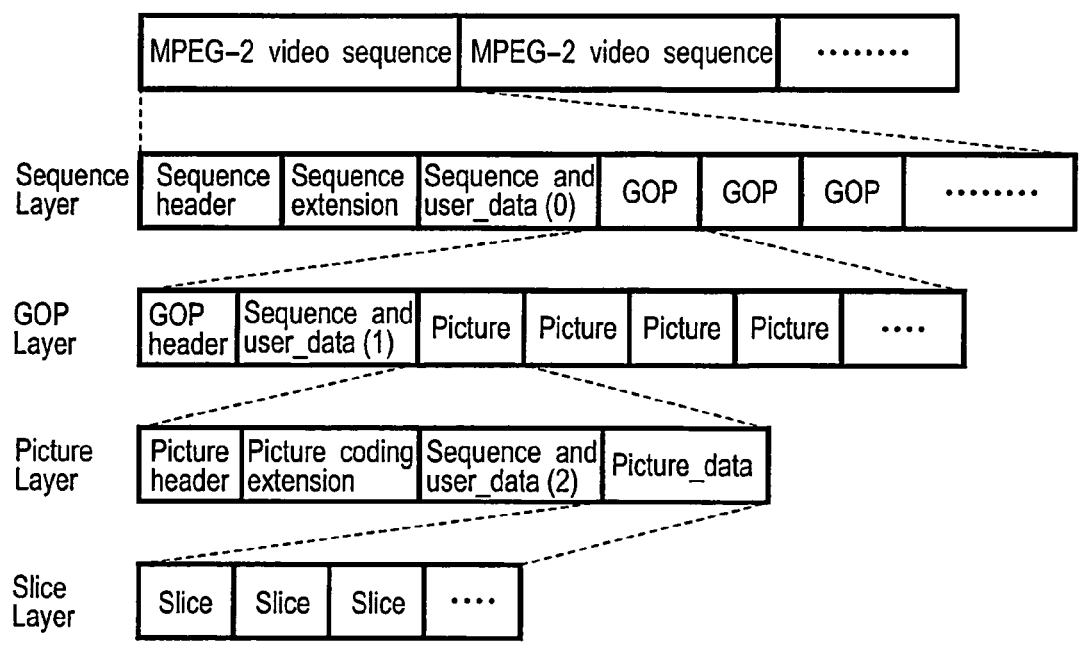
FIG. 5 is a diagram showing an example of the data structure of the MPEG-2 image encoding standard in a first embodiment.

The image signal encoding unit 13 encodes the non-3D image signal a by means of the MPEG-2 (Moving Picture Experts Group 2) image encoding standard (ISO/IEC 13818-2). FIG. 5 shows the data structure used by the MPEG-2 (ISO/IEC 13818-2) standard.

In the data structure shown in FIG. 5, "Sequence Layer", which is the highest layer of "MPEG-2 video sequence" includes the header area "Sequence header", the sequence extension area "Sequence extension", the user data area "Sequence and user_data(0)", and the picture areas "Group of Picture (GOP)". Each GOP includes the header area "Gop header", the user data area "Sequence and user_data(1)", and the pictures "Picture" that follow. In addition, each picture "Picture" starts with the header area "Picture header", followed by the code extension area "Picture coding extension" and the user data area "Sequence and user_data(2)".

The user data areas "Sequence and user_data(0)", "Sequence and user_data(1)", and "Sequence and user_data (2)" are described as the user_data( ) function that has the syntax structure. The control signal encoding unit 12 encodes the parameters of each of the control signals CTL1-CTL3 in one of the user data areas as syntax elements of the user_data( ) function. FIG. 6 is a diagram showing an example in which the control signals CTL1-CTL3 are encoded as the user_data( ) function.

In FIG. 6, the syntax element "user_data_start_code" is a 32-bit code for identifying that the user_data( ) function is encoded. The MPEG-2 (ISO/IEC 13818-2) standard stipulates that the value of "user_data_start_code" is "0000 0000 0000 0000 0000 0001 1011 0010".

The syntax element "associate_3d_parameter_identifier" is a 32-bit code for identifying that the parameter values of the control signals CTL1-CTL3 are encoded. When at least one of the parameter values of the control signals CTL1-CTL3 is encoded, the value of "associate_3d_parameter_identifier" is determined as follows by the rule of the MPEG-2 (ISO/IEC 13818-2) standard. That is, the value of the 24 bits from the start of "associate_3d_parameter_identifier" to the 24th bit, or the value of the 24 bits from the 9th bit to the end, is different from "0000 0000 0000 0000 0000 0001". In addition, any value that does not match other data, such as the values of parameters of control signals CTL1-CTL3, is assigned to the value of "associate_3d_parameter_identifier".

The syntax element "ctl1_enable" is a one-bit code used as a flag indicating whether the two parameters, "blending_parameter1_1" and "blending_parameter1_2", of the control signal CTL1 are to be encoded. If the value of "ctl1_enable" is 0, "blending_parameter1_1" and "blending_parameter1_2" are not encoded; if the value of "ctl1_enable" is 1, "blending_parameter1_1" and "blending_parameter1_2" are encoded.

"blending_parameter1_1" is an eight-bit code indicating the composite percentage k1 of the basic depth model A that is one of the parameters included in the control signal CTL1.

"blending_parameter1_2" is an eight-bit code indicating the composite percentage k2 of the basic depth model B that is one of the parameters included in the control signal CTL1.

Because each of "blending_parameter1_1" and "blending_parameter1_2" is an eight-bit code, it has a value corresponding to the maximum value of 255. For example, when the composite percentages of the basic depth models A-C are k1=0.6, k2=0.3, and k3=0.1 respectively, the value of "blending_parameter1_1" is a value corresponding to 153 (=255× 60/100). The value of "blending_parameter1_2" is a value corresponding to 77 (=255×30/100).

The syntax element "ct12_enable" is a one-bit code used as a flag indicating whether the syntax element "blending_parameter2", which indicates the parameter of the control signal CTL2, is to be encoded. If the value of "ct12_enable" is 0, "blending_parameter2" is not encoded; if the value of "ct12_enable" is 1, blending_parameter2" is encoded.

"blending_parameter2", which is the parameter of the control signal CTL2, indicates a weighting coefficient that puts a weight on the R signal component of the non-3D image signal a. "blending_parameter2" is also an eight-bit code with a value corresponding to the maximum value of 255. For example, when the weighting coefficient is 0.2, "blending_parameter2" has a value corresponding to 51.

The syntax element "ct13_enable" is a one-bit code used as a flag indicating whether the syntax elements "shift_adjust_parameter1" and "shift_adjust_parameter2", which are two parameters of the control signal CTL3, are to be encoded. If the value of "ct13_enable" is 0, "shift_adjust_parameter1" and "shift_adjust_parameter2" are not encoded; if the value of "ct13_enable" is 1, "shift_adjust_parameter1" and "shift_adjust_parameter2" are encoded.

"shift_adjust_parameter1" is an eight-bit code indicating the convergence value that is one of the parameters included in the control signal CTL3. "shift_adjust_parameter2" is an eight-bit code indicating the depth value that is one of the parameters included in the control signal CTL3. Because each of "shift_adjust_parameter1" and "shift_adjust_parameter2" is an eight-bit code, it has a value corresponding to the maximum value of 255.

The control signal encoding unit 12 encodes the control signals CTL1-CTL3 by means of the user_data( ) function, shown in FIG. 6, for generating an encoded bit string b1, and supplies the encoded bit string b1 to the multiplexing unit 14, one for each frame. The encoded bit string b1 is not limited to a bit string that includes all control signals CTL1-CTL3. If the control signal determination unit 11 determines that none of the control signals CTL1-CTL3 are included, the control signal encoding unit 12 does not generate the encoded bit string b1 but sends the signal, indicating that there is no control signal, to the multiplexing unit 14.

An encoded bit string b2 of one frame of the non-3D image signal a, generated by the image signal encoding unit 13, is sent to the multiplexing unit 14, in synchronization either with the encoded bit string b1 generated by the control signal encoding unit 12 or with the signal indicating that there is no control signal.

The multiplexing unit 14 multiplexes the encoded bit string b1 of the control signals CTL1-CTL3 and the encoded bit string b2 of the non-3D image signal a and outputs a multiplexed encoded bit string c. If there is no control signals CTL1-CTL3, the multiplexing unit 14 uses the encoded bit string b2 of the non-3D image signal a as the encoded bit string c. The encoded bit string c, output by the multiplexing unit 14, can be sent, for example, in the manner described below.

Figure 7:
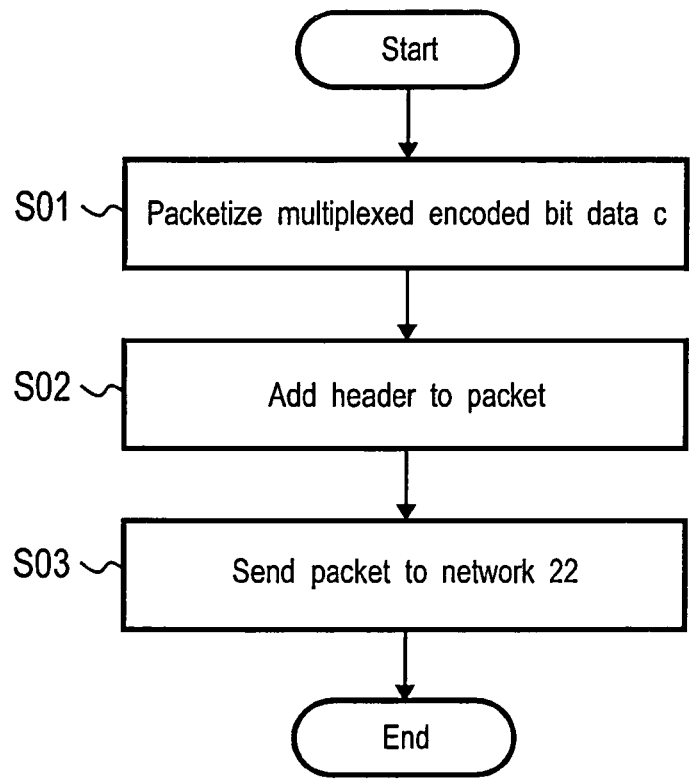
FIG. 7 is a flowchart showing the transmission method for transmitting an encoded bit string to a network in the first embodiment.

FIG. 7 is a flowchart showing the transmission method in which the encoded bit string c, sent from the multiplexing unit 14, is transmitted to a network 22. First, a transmission interface 21 packetizes the encoded bit string c generated by the multiplexing unit 14 (step S01). Next, the transmission interface 21 generates the packet header information and adds the packet header to the packet generated in step S01 (step S02). After that, the transmission interface 21 sends the packet, to which the packet header information is added in step S02, to the network 22 (Step S03).

Figure 8:
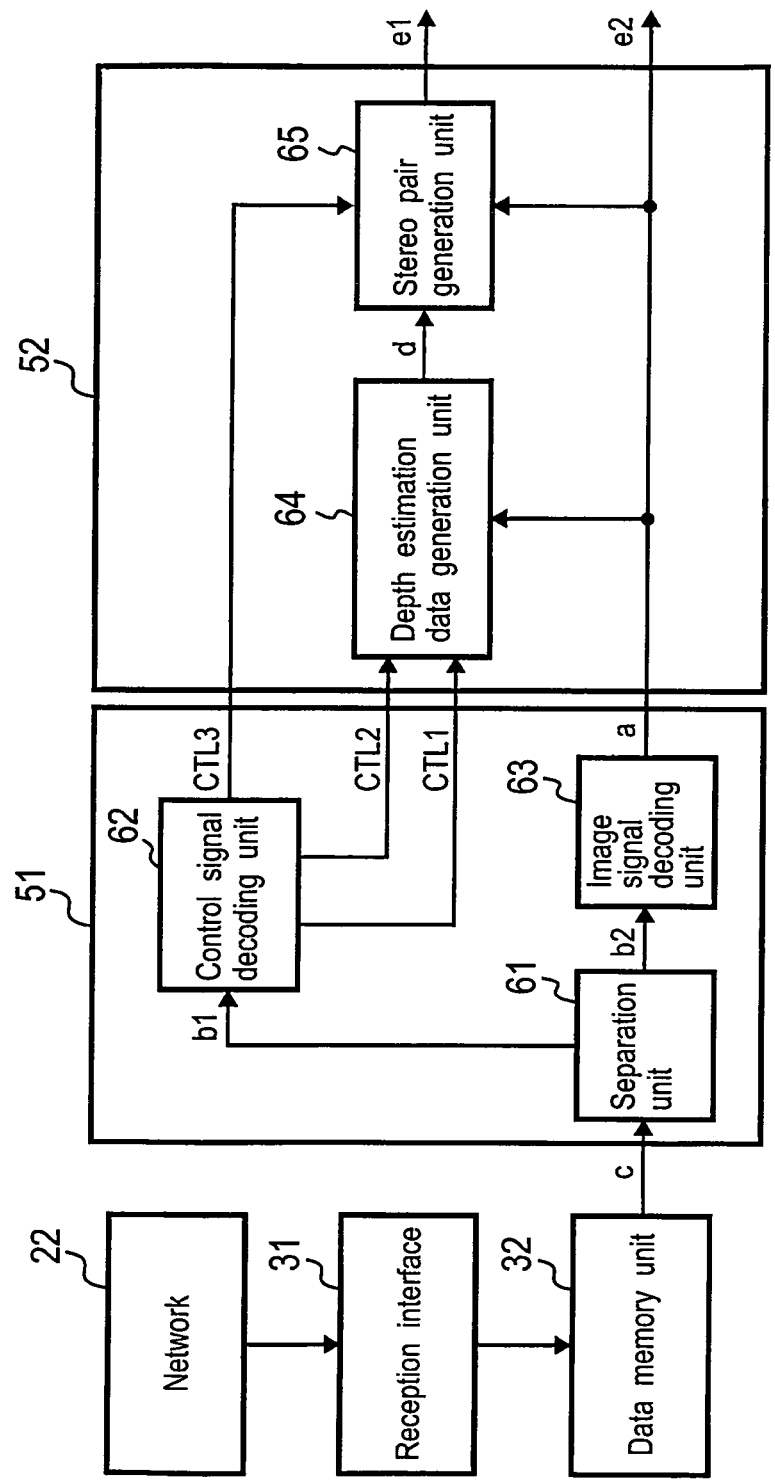
FIG. 8 is a diagram showing an example of the configuration of an image decoding device and a pseudo 3D image generation device in the first embodiment.
Figure 9:
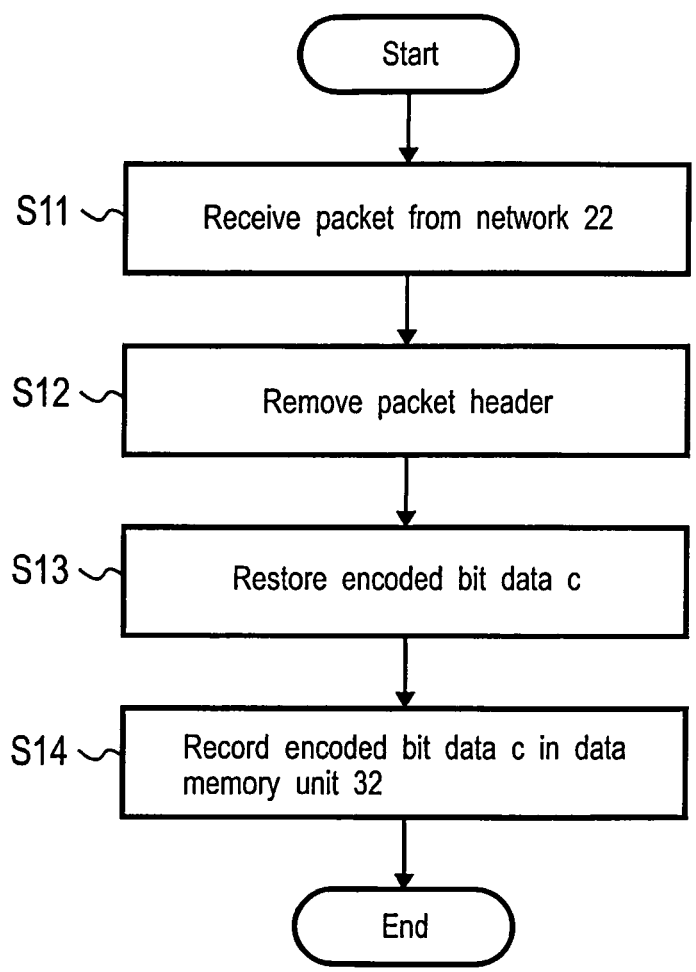
FIG. 9 is a flowchart showing the method for restoring a packet, received from a network, as an encoded bit string in the first embodiment.

Next, the following describes the decoding of a non-3D image signal for generating a pseudo 3D image in the first embodiment with reference to FIG. 8 and FIG. 9. FIG. 8 is a diagram showing an example of the configuration an image decoding device and a pseudo 3D image generation device. FIG. 9 is a flowchart showing the method in which the encoded bit string c is restored from the packet sent to the network 22 in FIG. 7 and the restored bit string c is stored in a data memory unit 32.

First, a reception interface 31 receives a packet, which includes information the non-3D image signal a and the control signals CTL1-CTL3, from the network 22 (step S11). Next, the reception interface 31 deletes the packet header from the packet (step S12). After that, the reception interface 31 decodes the encoded bit string c from the packet (step S13). Next, the reception interface 31 sends the encoded bit string c to the data memory unit 32, and the data memory unit 32 stores the encoded bit string c therein (step S14).

As shown in FIG. 8, an image decoding device 51 comprises a separation unit 61, a control signal decoding unit 62 that decodes the encoded bit string into the control signals CTL1-CTL3, and an image signal decoding unit 63 that decodes the encoded bit string into the non-3D image signal a, and a pseudo 3D image generation device 52 comprises a depth estimation data generation unit 64 and a stereo pair generation unit 65. The encoded bit string c is supplied from the data memory unit 32 to the separation unit 61.

The separation unit 61 checks the encoded bit string c to see if the user_data( ) function, shown in FIG. 6, is encoded. If the value of "user_data_start_code" is "0000 0000 0000 0000 0000 0001 1011 0010" that is the same value as that when the user_data( ) function is encoded, the user_data( ) function is encoded.

If it is found that the user_data( ) function is not encoded, the separation unit 61 supplies the encoded bit string c to the image signal decoding unit 63 as the encoded bit string b2. If it is found that the user_data( ) function is encoded, the separation unit 61 checks if "associate_3d_parameter_identifier" is encoded. If it is found that "associate_3d_parameter_identifier" is not encoded, that is, the value does not match the one assigned in advance, the separation unit 61 supplies the encoded bit string c to the image signal decoding unit 63 as the encoded bit string b2.

On the other hand, if "associate_3d_parameter_identifier" is encoded, that is, if the value matches the value assigned in advance, the separation unit 61 performs the following processing. That is, the separation unit 61 extracts the syntax elements, from "associate_3d_parameter_identifier" in the user_data( ) function included in the encoded bit string c to the syntax element immediately preceding "next_start_code" shown in FIG. 6, as the encoded bit string b1 in which the control signals CTL1-CTL3 are included. And, the separation unit 61 separates the encoded bit string b1 and the encoded bit string b2, wherein the encoded bit string b2 is the encoded bit extracted from the encoded bit string c other than the encoded bit string b1, that is, the encoded bit string including the non-3D image signal a.

The encoded bit string b1, which includes the separated control signals CTL1-CTL3, is supplied to the control signal decoding unit 62. The encoded bit string b2, which includes the separated image signal, is supplied to the image signal decoding unit 63.

The control signal decoding unit 62 decodes the encoded bit string b1 of the control signals CTL1-CTL3 supplied from the separation unit 61. If the value of "ct11_enable" is 0, the control signal decoding unit 62 does not decode "blending_parameter1_1" and "blending_parameter1_2". On the other hand, if the value of "ct11_enable" is 1, the control signal decoding unit 62 decodes "blending_parameter1_1" and "blending_parameter1_2" for generating the control signal CTL1.

Similarly, if the value of "ct12_enable" is 0, the control signal decoding unit 62 does not decode "blending_parameter2". On the other hand, if the value of "ct12_enable" is 1, the control signal decoding unit 62 decodes "blending_parameter2" for generating the control signal CTL2. If the value of "ct13_enable" is 0, the control signal decoding unit 62 does not decode "shift_adjust_parameter1" and "shift_adjust_parameter2". On the other hand, if the value of "ct13_enable" is 1, the control signal decoding unit 62 decodes "shift_adjust_parameter1" and "shift_adjust_parameter2" for generating the control signal CTL3.

The control signal decoding unit 62 supplies the control signals CTL1 and CTL2 to the depth estimation data generation unit 64, and supplies the control signal CTL3 to the stereo pair generation unit 65. The control signals not generated by the control signal decoding unit 62 are not supplied to the depth estimation data generation unit 64 and the stereo pair generation unit 65.

The image signal decoding unit 63 decodes the encoded bit string b2 into the non-3D image signal a. The decoded non-3D image signal a is supplied to the depth estimation data generation unit 64 and the stereo pair generation unit 65.

Figure 10:
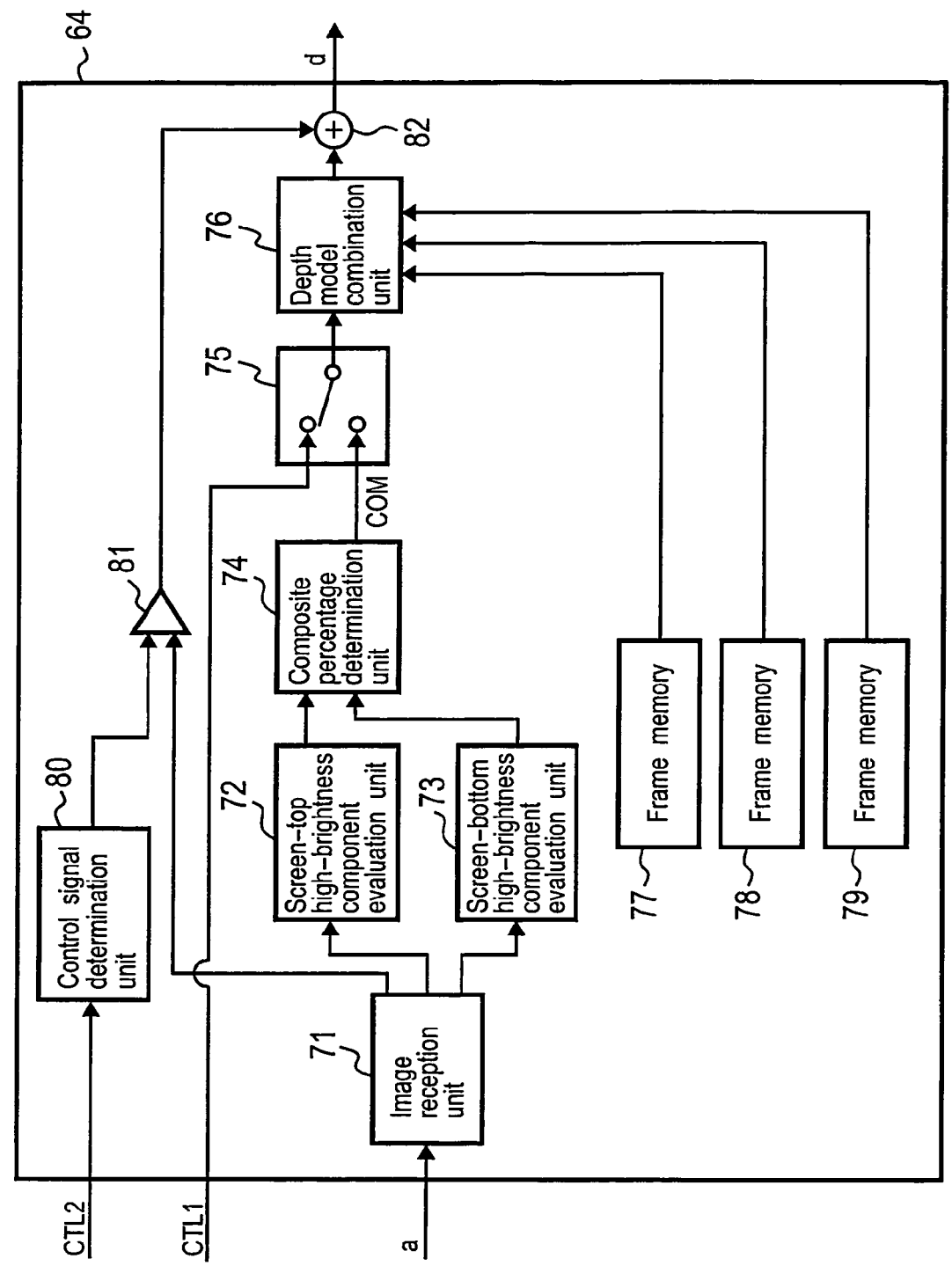
FIG. 10 is a diagram showing an example of the configuration of a depth estimation data generation unit in the first embodiment.

FIG. 10 is a diagram showing an example of the configuration of the depth estimation data generation unit 64. An image reception unit 71 receives the non-3D image signal a from the image signal decoding unit 63 and stores the received data therein. The image reception unit 71 has a frame memory in which one frame of non-3D image signal a is stored.

The image reception unit 71 supplies one frame of the non-3D image signal a to a screen-top high-brightness component evaluation unit 72 and a screen-bottom high-brightness component evaluation unit 73 and supplies only the R signal component of the non-3D image signal a to a weighting unit 81. The screen-top high-brightness component evaluation unit 72 calculates the ratio of pixels having high-brightness components to the pixels in the area about top 20% of the whole screen of one frame of the non-3D image signal a. The calculated ratio is the screen-top high-brightness component evaluation value. The screen-top high-brightness component evaluation unit 72 supplies the screen-top high-brightness component evaluation value to a composite percentage determination unit 74.

The screen-bottom high-brightness component evaluation unit 73 calculates the ratio of pixels having high-brightness components to the pixels in the area about bottom 20% of the whole screen of one frame of the non-3D image signal a. The calculated ratio is the screen-bottom high-brightness component evaluation value. The screen-bottom high-brightness component evaluation unit 73 supplies the signal that includes the screen-bottom high-brightness component evaluation value to the composite percentage determination unit 74.

Based on the supplied screen-top high-brightness component evaluation value and the screen-bottom high-brightness component evaluation value, the composite percentage determination unit 74 automatically calculates the composite percentage k1 of the basic depth model A and the composite percentage k2 of the basic depth model B according to the predetermined method without considering the scene of the image. The composite percentage determination unit 74 supplies the composite percentages k1 and k2 to a switch 75 as a composite percentage signal COM which includes the parameters "blending_parameter1_1" and "blending_parameter1_2". The parameters "blending_parameter1_1" and "blending_parameter1_2" are eight-bit codes. The method for automatically determining the composite percentages k1 and k2 is described in detail in Japanese Patent Laid-Open Publication No. 2005-151534.

When the control signal CTL1 is supplied from the control signal decoding unit 62, the switch 75 selects the control signal CTL1 preferentially and supplies it to a depth model combination unit 76. When the control signal CTL1 is supplied to the switch 75, the above-described processing of the screen-top high-brightness component evaluation unit 72, screen-bottom high-brightness component evaluation unit 73, and composite percentage determination unit 74 may be omitted. On the other hand, when the control signal CTL1 is not supplied, the switch 75 selects the composite percentage signal COM supplied from the composite percentage determination unit 74. The switch 75 supplies the selected signal to the depth model combination unit 76.

A frame memory 77 causes the depth model combination unit 76 to generate an image signal or a predetermined calculation expression corresponding to the basic depth model A shown in FIG. 2, a frame memory 78 causes the depth model combination unit 76 to generate an image signal or a predetermined calculation expression corresponding to the basic depth model B shown in FIG. 3, and a frame memory 79 causes the depth model combination unit 76 to generate an image signal or a predetermined calculation expression corresponding to the basic depth model C shown in FIG. 4. The image signals and the predetermined calculation expressions described above are stored in advance in the frame memories 77-79.

Based on the control signal CTL1 or the composite percentage signal COM supplied from the switch 75, the depth model combination unit 76 combines the image signals of the basic depth models A-C to generate the image signal of a composite depth model. When the predetermined calculation expressions are stored in the frame memories, the depth model combination unit 76 calculates the basic depth models A-C according to the predetermined calculation expressions and, after that, combines those models.

The depth model combination unit 76 extracts the composite percentage k1 of the basic depth model A and the composite percentage k2 of the basic depth model B from the eight-bit parameters included in the supplied control signal CTL1 or the composite percentage signal COM. Because the total of the composite percentages k1-k3 of the three types of basic depth models is 1, the composite percentage k3 of the basic depth model C is calculated by subtracting k1 and k2 from 1. The depth model combination unit 76 combines the image signals of the basic depth models A-C using the composite percentages k1-k3, calculates the image signal of the composite depth model, and supplies the calculated image signal to an addition unit 82.

The control signal determination unit 80 checks if the control signal CTL2 is supplied from the control signal decoding unit 62. If the control signal CTL2 is not supplied, the control signal determination unit 80 supplies the control signal CTL2, which includes the parameter stored in advance in the control signal determination unit 80 and corresponding to the weighting parameter, to the weighting unit 81.

The weighting unit 81 puts a weight on the R signal component of the non-3D image signal a, supplied from the image reception unit 71, based on the weighting coefficient included in the control signal CTL2. The weighting unit 81 converts the eight-bit parameter, included in the control signal CTL2, to a weighting coefficient that does not exceed the maximum value of 1. The weighting unit 81 multiplies the R signal component, supplied from the image reception unit 71, by the weighting coefficient and outputs the multiplication result to the addition unit 82. The reason for using the R signal component is that the magnitude of the R signal component matches the irregularity of the original image with a high probability in the near follow-light environment and in the condition in which the change in the degree of brightness (brightness) of the texture is not high. A texture, which is an element constituting an image, is composed of one pixel or a group of pixels.

The addition unit 82 superimposes the R signal component of the weighted non-3D image signal a, supplied from the weighting unit 81, on the composite depth model supplied from the depth model combination unit 76 for generating a depth estimation data signal d. If the superimposed value exceeds the predetermined number of bits allocated to the depth estimation data signal d, the superimposed value is limited by the predetermined number of bits. The generated depth estimation data signal d is supplied to the stereo pair generation unit 65.

Figure 11:
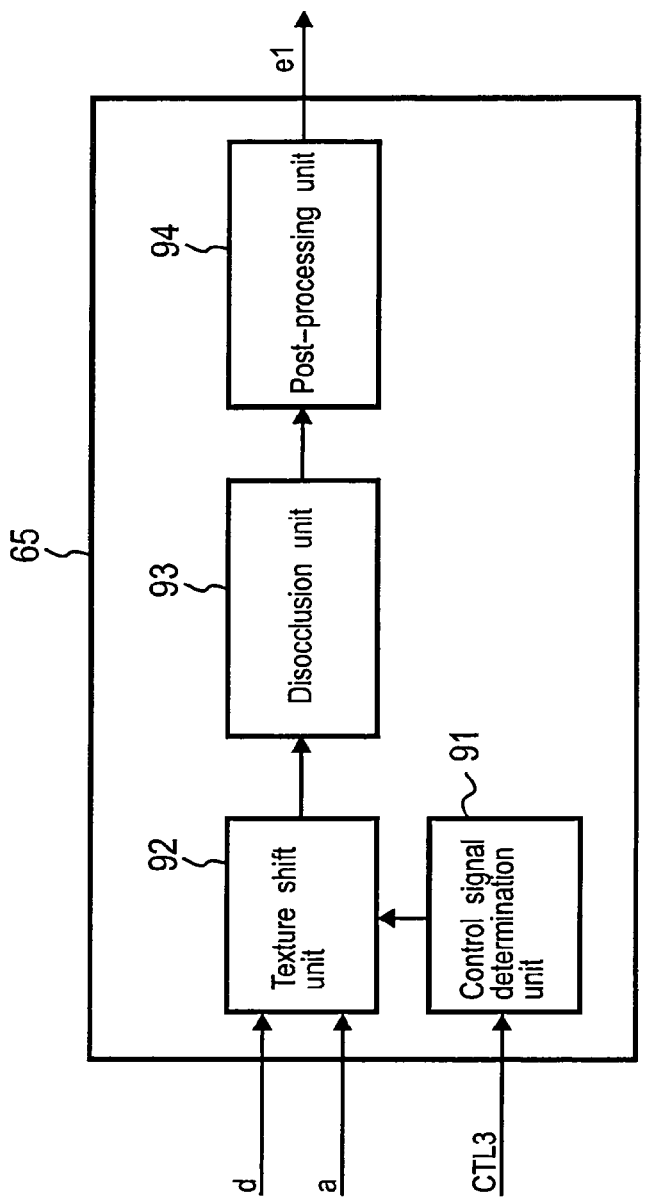
FIG. 11 is a diagram showing an example of the configuration of a stereo pair generation unit in the first embodiment.

FIG. 11 is a diagram showing an example of the configuration of the stereo pair generation unit 65. A control signal determination unit 91 determines if the control signal CTL3 is supplied from the control signal decoding unit 62. If the control signal CTL3 is not supplied, the control signal CTL3, which is stored in advance in the control signal determination unit 91 and which includes two parameters indicating the convergence and the depth, is supplied to a texture shift unit 92. If the control signal CTL3 is supplied, the two parameters included in the control signal CTL3 can be used to change the convergence and the depth according to the non-3D image signal a.

Based on the supplied non-3D image signal a, the depth estimation data signal d, and the control signal CTL3, the texture shift unit 92 generates an image signal from a viewpoint different from that of the non-3D image signal a. For example, the texture shift unit 92 generates an image signal with the viewpoint shifted left relative to the viewpoint that is used when the non-3D image signal a, decoded by the image signal decoding unit 63, is displayed on the screen. In this case, when the texture is displayed to the viewer as a close view, the texture shift unit 92 moves the texture of the non-3D image signal a to the right on the screen a predetermined amount; when the texture is displayed to the viewer as a distant view, the texture shift unit 92 moves the texture to the left on the screen a predetermined amount. The reason is that, when the viewer views an image whose viewpoint is moved to the left, the viewer can view a close view in the inside (nose side) of the viewer, and a distant view outside of the viewer.

Now, let Yd be the brightness value of each pixel of the depth estimation data d, let m be the convergence value representing a pop-up effect, and let n be the depth value representing a spatial effect. The texture shift unit 92 supplies the image signal to a disocclusion unit 93 wherein the texture of the non-3D image signal a corresponding to the brightness value Yd is shifted right (Yd-m)/n pixels for each pixel in ascending order of brightness value Yd. If the value of (Yd-m)/n is negative, the actual texture is shifted left (m-Yd)/n pixels.

A texture with a low brightness value Yd of the depth estimation data d appears to the viewer in the back of the screen, while a texture with a high brightness value Yd appears in the front of the screen. The brightness value Yd, the convergence value m, and the depth value n are each in the range 0-255. For example; the convergence value m=200 and the depth value n=20 are set in advance in the control signal determination unit 91.

The shift width of the above-described texture shifted on a pixel basis indicates the shift width of the brightness signal or the RGB when the color space of the non-3D image signal a is one of YUV, YCbCr, and YPbPr. When the color space of the non-3D image signal a is one of YUV, YCbCr, and YPbPr, the shift width of the color-difference signal is the one generated by scaling the shift width of the brightness signal. For example, when the ratio among the brightness signal Y, the blue differential signal U, and the red differential signal V is 4:2:2 or 4:2:0 in the color space YUV, the shift width of the color-difference signal is the value generated by scaling the shift width of the brightness signal down to ½. That is, for the color difference signal, the texture of the non-3D image signal a is shifted right (Yd-m)/(2·n) pixels on a pixel basis.

The disocclusion unit 93 performs disocclusion for the image signal supplied from the texture shift unit 92, and supplies the disoccluded image signal to a post-processing unit 94. An occlusion refers to a part of pixels where no values are generated after a texture is moved a predetermined amount. The disocclusion unit 93 fills occluded positions using the original non-3D image signal a corresponding to the texture-shifted image signal. Disocclusion may also be performed using the method described in the known document (Kunio Yamada, Kenji Mochizuki, Kiyoharu Aizawa, and Takahiro Saito: Disocclusion Based on the Texture Statistics of the Image Segmented by the Region Competition Algorithm, The Journal of the Institute of Image Information and Television Engineers, Vol. 56, No. 5, pp. 863-866 (May, 2002)).

The post-processing unit 94 performs post-processing, such as smoothing and noise elimination, as necessary for the image signal supplied from the disocclusion unit 93 and outputs the left-eye's image signal e1. This post-processing is performed using a known method. The non-3D image signal a decoded by the image signal decoding unit 63 is the right-eye's image signal e2.

The viewer can view a stereo image by displaying the right-eye's image signal e2 and post-processed left-eye's image signal e1. This stereo image can be displayed on a stereo display device such as a device with multiple projections, a projection device or a display in which the time-division display and the liquid crystal shutter glasses are combined, a lenticular based stereo display, an anaglyph based stereo display, and a head-mounted display. The stereo display device may be a multi-view 3D video display device capable of displaying three or more viewpoints or a device that has an audio output unit. For a still image with no audio information, an ambient sound suitable for the image may be added.

In this embodiment, three types of control signals CTL1-CTL3 are used to change the composite percentages of three types of basic depth models to suit a scene, to put a weight on the superimposing R signal component, and to adjust the convergence and the depth of depth estimation data. Therefore, the configuration of this device allows a pre-set pseudo 3D effect to be changed according to the scene of an image, thus generating a natural pseudo 3D image.

Second Embodiment

An image encoding device 1 in a second embodiment is different from the image encoding device 1 in the first embodiment in the control signals CTL1-CTL3 and the encoding method of the non-3D image signal a. In addition, an image decoding device 51 in the second embodiment is different from the image decoding device 51 in the first embodiment in the method in which the encoded bit string b1 and the encoded bit string b2 are decoded. The other part is the same as that of the first embodiment and so the description is omitted.

An image signal encoding unit 13 in the image encoding device 1 in the second embodiment uses H.264/AVC image encoding method to encode a non-3D image signal a. When the H.264/AVC image encoding method is used to encode a non-3D image signal a, the control signals CTL1-CTL3 can be encoded using the SEI (Supplemental Enhancement Information) message, one type of auxiliary information.

Figure 12:
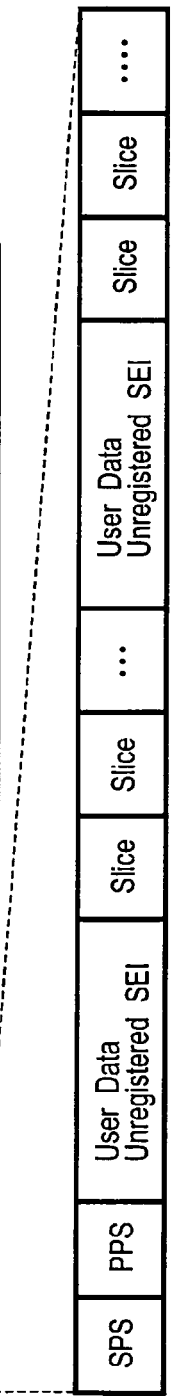
FIG. 12 is a diagram showing the data structure of the H.264/AVC image encoding method in a second embodiment.

FIG. 12 shows the data structure used in the H.264/AVC image encoding method. "AVC/H.264 video sequence" includes the sequence parameter SPS (Sequence Parameter Set)", picture parameter "PPS (Picture Parameter Set)", auxiliary information "User Data Unregistered SEI", and slices "Slice" constituting a picture.

A control signal encoding unit 12 encodes the control signals CTL1-CTL3 using "user_data_payload_byte" defined as a syntax element of "User Data Unregistered SEI" for each screen. "user data_payload_byte" is described arbitrarily as the user_data_unregistered(payloadSize) function. Like the user_data( ) function described in FIG. 5, the user_data_unregistered(payloadSize) function is a function having the syntax structure.

FIG. 13 is an example in which the control signals CTL1-CTL3 are encoded as the user_data_unregistered(payloadSize) function. A 128-bit code is assigned to the syntax element "uuid_iso_iec_11578" to indicate that the control signals CTL1-CTL3 are encoded. Any value, which does not match the data values of the parameters of the control signals CTL1-CTL3, may be assigned to "uuid_iso_iec_11578". "ctl1_enable" and the other syntax elements, which follow "uuid_iso_iec_11578", are encoded in the same manner as in the user_data( ) function described in FIG. 5.

Following the encoded SEI message, one screen of non-3D image signal a is encoded in one or more "Slices". The values of the control signals CTL1-CTL3 encoded by the SEI message are applicable to the "Slices" that follow.

A separation unit 61 in the image decoding device 51 in the second embodiment checks if "User Data Unregistered SEI", included in the encoded bit string c encoded by the image encoding device 1 in the second embodiment, is encoded. If it is found that "User Data Unregistered SEI" is encoded, the separation unit 61 decodes "uuid_iso_iec_11578" and checks its value. If it is determined that the value is a pre-set 128-bit code indicating that the control signals CTL1-CTL3 are encoded, the encoded bit string of "User Data Unregistered SEI" is separated from the encoded bit string c and the separated bit string is used as the encoded bit string b1. The encoded bit string b1 is supplied to a control signal decoding unit 62. The rest of the encoded bit string is supplied to a image signal decoding unit 63 as the encoded bit string b2.

The control signal decoding unit 62 decodes the encoded bit string b1 based on the data structure shown in FIG. 13 to acquire the control signals CTL1-CTL3. The image signal decoding unit 63 decodes the encoded bit string b2 to acquire the non-3D image signal a.

Third Embodiment

An image encoding device 2 in a third embodiment is different from the image encoding device 1 in the first and second embodiments in the method in which the control signals CTL1-CTL3 are encoded and in that the encoded bit string b1 of the control signals CTL1-CTL3 is included in the header part of a packet. In addition, an image decoding device 51 in the third embodiment is different from the image decoding device 51 in the first and second embodiments in that the encoded bit string b1 of the control signals CTL1-CTL3 and the encoded bit string b2 of the non-3D image signal a are separated from the packetized encoded bit string c and in the method in which the encoded bit string b1 of the control signals CTL1-CTL3 is decoded. The other part is the same as that in the first and second embodiments and so the description is omitted.

Figure 14:
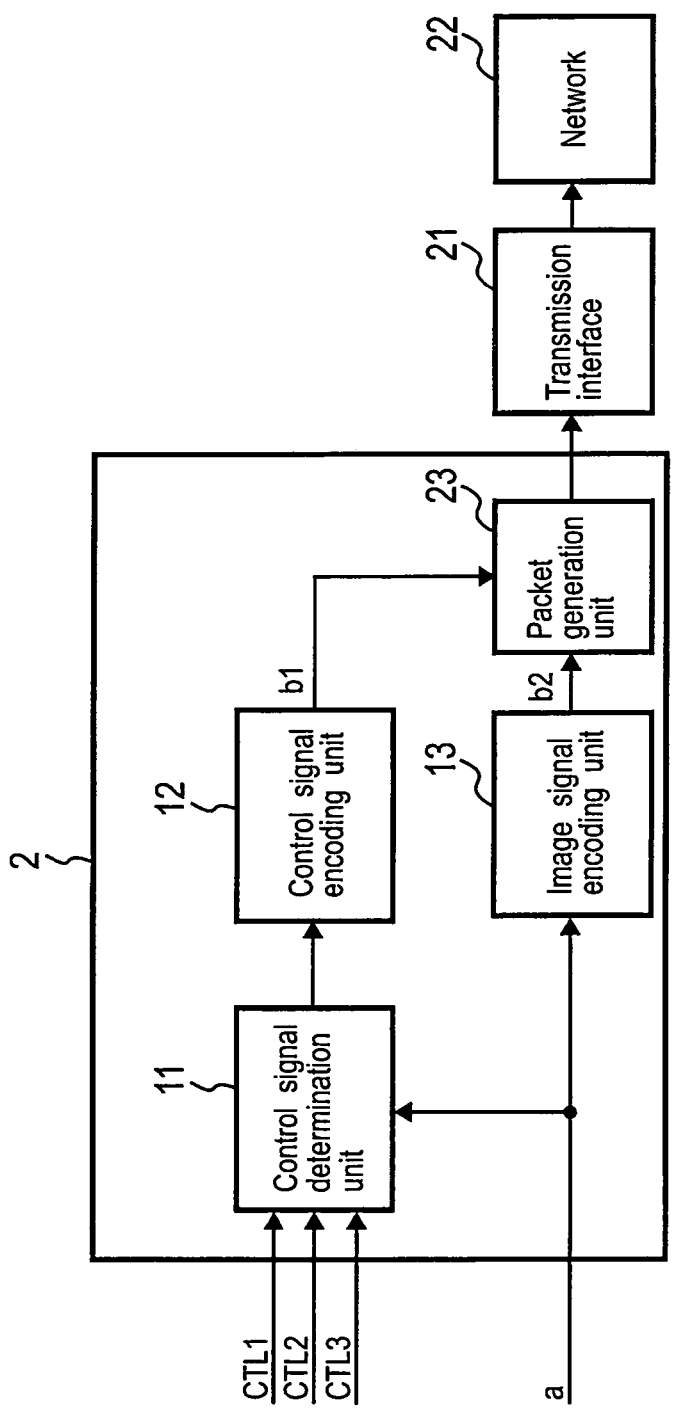
FIG. 14 is a block diagram showing an example of the configuration of an image encoding device in a third embodiment.

FIG. 14 is a block diagram showing an example of the configuration of the pseudo 3D image encoding device 2. In FIG. 14, the same reference numeral is attached to the same configuration block as that in FIG. 1. The packet generation unit 23 in the pseudo 3D image encoding device 2 uses the MPEG-2 system standard (ISO/IEC13818-1) to packetize the encoded bit string b2 of the non-3D image signal a, output from the image signal encoding unit 13, as a PES (Packetized Elementary Stream).

At this time, the encoded bit string b1 of the control signals CTL1-CTL3, output from the control signal encoding unit 12, is included in the header of the packet using the method that will be described later. The packet generation unit 23 uses the MPEG-2 TS(Transport Stream) method or the MPEG-2 PS (Program Stream) method to packetize the packetized encoded bit string and outputs it to the transmission interface 21. In this embodiment, only the output via the MPEG-2 TS(Transport Stream) method is described.

Figure 15:
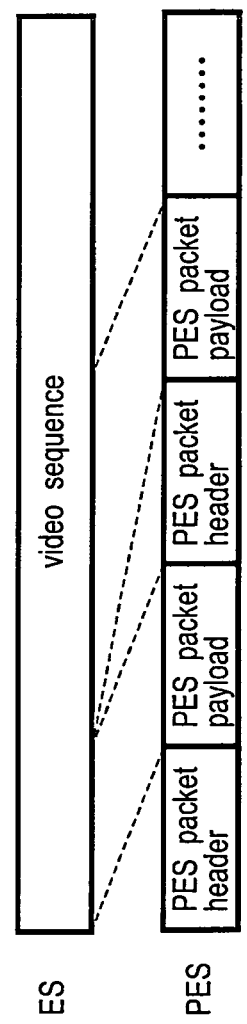
FIG. 15 is a diagram showing the data structure of a PES packet in the MPEG-2 system standard in the third embodiment.

FIG. 15 is a diagram showing the data structure of a PES packet used in the MPEG-2 system standard (ISO/IEC13818-1) The encoded image signal and audio signal are called an elementary stream (ES). The ES of the image signal and the audio signal is divided into smaller sizes for processing and packetized as PES packets with the PES packet header added.

APES packet includes the header part "PES packet header" and the payload part "PES packet payload" that include the image signal and the audio signal. The control signal encoding unit 12 encodes the control signals CTL1-CTL3 in "PES_private_data" defined in the "PES packet header" as arbitrarily writable used data.

"PES_private_data" is described as a PES_packet( ) function having the syntax structure. The parameter values of the control signals CTL1-CTL3 are encoded as the syntax elements of the PES_packet( ) function. Note that the non-3D image signal a is encoded in "PES packet payload".

FIG. 16 is an example in which the control signals CTL1-CTL3 are encoded as the PES_packet( ) function. "PES_private_data", which is encoded by the packet generation unit 23, can be encoded by setting the "PES_extension_flag" and "PES_private_data_flag", both of which are defined as flags, to 1. "ctl1_enable" and the other syntax elements, which follow the syntax element "associate_3d_parameter_identifier", are the syntax elements encoded by the control signal encoding unit 12 in the same manner as in the user_data( ) function described in FIG. 5.

"PES_private_data" is defined as 128-bit data. So, 53-93 stuffing bits are inserted after the syntax elements, in which the control signals CTL1-CTL3 are described, so that the total length of "PES_private_data" is 128 bits long. The encoded control signals CTL1-CTL3 included in one PES packet are applied to the encoded non-3D image signal a included in "PES packet payload" in the same PES packet.

A separation unit 61 in the image decoding device 51 in the third embodiment decodes the header part of the TS packet from the encoded bit string c to separate the header part from the payload part of the TS packet. In addition, the separation unit 61 decodes "PES packet header" in the PES packets included in the payload part of the TS packet to separates "PES packet header" from "PES packet payload".

The separation unit 61 checks if "associate_3d_parameter_identifier", included in "PES packet header" in the PES packet packetized by the image encoding device 2 in the third embodiment, is encoded. If it is found that "associate_3d_parameter_identiifer" is encoded, the separation unit 61 extracts the 128-bit encoded bit string shown in FIG. 16, from "associate_3d_parameter_identifier" to "stuffing_bits", as the encoded bit string b1 of the control signals CTL1-CTL3 and supplies the extracted bit string b1 to a control signal decoding unit 62.

In addition, the separation unit 61 supplies "PES packet payload" of the PES packet to an image signal decoding unit 63 as the encoded bit string b2. The control signal decoding unit 62 decodes the encoded bit string b1, created based on the structure shown in FIG. 16, to generate the control signals CTL1-CTL3. In addition, the image signal decoding unit 63 decodes the encoded bit string b2 to generate the decoded non-3D image signal a.

Fourth Embodiment

An image encoding device 2 in a fourth embodiment is different from the image encoding device 2 in the third embodiment in the method in which the control signals CTL1-CTL3 are encoded and in that the encoded bit string b1 of the control signals CTL1-CTL3 is included in the header part of a TS packet. In addition, an image decoding device 51 in the fourth embodiment is different from the image decoding device 51 in the third embodiment in that the encoded bit string b1 of the control signals CTL1-CTL3 is separated from the encoded bit string c of a TS packet and in the method in which the encoded bit string b1 of the control signals CTL1-CTL3 is decoded. The other part is the same as that in the third embodiment and so the description is omitted.

Figure 17:
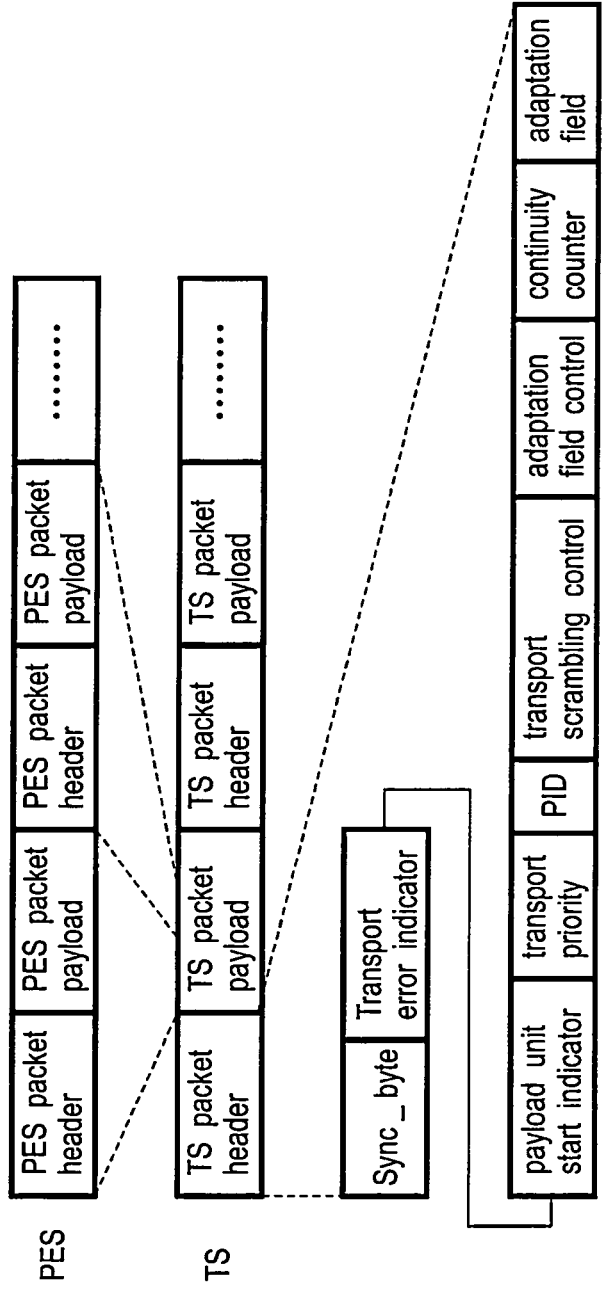
FIG. 17 is a diagram showing the data structure of a transport stream in the MPEG-2 system standard in a fourth embodiment.

FIG. 17 is a diagram showing the data structure of a TS packet defined by the MPEG-2 system standard (ISO/IEC 13818-1). A TS packet includes the header part "TS packet header" and the payload part "TS packet payload". "TS packet payload" includes PES packets described in the description of the image encoding device 2 in the third embodiment.

"TS packet header" includes the adaptation field area "adaptation field". A packet generation unit 23 can encode the parameters of the control signals CTL1-CTL3, not in a PES packet described in the description of the image encoding device 2 in the third embodiment, but in "adaptation field" in "TS packet header" of a TS packet.

A control signal encoding unit 12 encodes the control signals CTL1-CTL3 using "private_data_byte" defined as user data arbitrarily writable in "adaptation field" in "TS packet header". "private_data_byte" can be described as an adaptation_field( ) function having the syntax structure. Note that the encoded bit string b2 of the non-3D image signal a is included in "TS packet payload".

FIG. 18 is an example in which the control signals CTL1-CTL3 are encoded as the adaptation_field( ) function. The syntax element "adaptation_field_length" contains the total number of bytes of "adaptation field" that follows. "private_data_byte", which is user data, can be encoded by setting the syntax element "transport_private_data_flag" to 1.

The syntax element "transport_private_data_length" contains the total number of bytes of the control signals CTL1-CTL3 that follow. "ctl1_enable" and other syntax elements that follow the syntax element "associate_3d_parameter_identifier" contain the control signals CTL1-CTL3 encoded in the same manner as in the user_data( ) function described in FIG. 5.

"private_data_byte" is defined in bytes (eight-bit units). To satisfy this requirement, the stuffing bits (0-7 bits) are inserted after the syntax elements, which describe the control signals CTL1-CTL3, so that the size of "private_data_byte" is an integral multiple of one byte. The encoded control signals CTL1-CTL3 included in one TS packet are applicable to the non-3D image signal a included in "TS packet payload" in the same TS packet. The size of a TS packet is fixed at 188 bytes. One screen of encoded non-3D image signal a is packetized in multiple TS packets. So, the values of the control signals CTL1-CTL3 are equal among the packets that correspond to one screen of non-3D image signal a.

A separation unit 61 in the image encoding device 2 decodes "TS packet header" in a TS packet from the encoded bit string c to separate it from "TS packet payload". The separation unit 61 checks if "adaptation_field" in "TS packet header" is encoded. If "adaptation_field" is encoded, the separation unit 61 checks if "associate_3d_parameter_identifier" is encoded. If it is found that "associate_3d_parameter_identifier" is encoded, that is, if it is determined that "associate_3d_parameter_identifier" is a 32-bit code indicating that the control signals CTL1-CTL3 are encoded, the separation unit 61 performs the following processing.

The separation unit 61 extracts the encoded bit string shown the data structure in FIG. 18, from "associate_3d_parameter_identifier" to "stuffing_bits", as the encoded bit string b1 including the control signals CTL1-CTL3. The separation unit 61 supplies the extracted encoded bit string b1 to a control signal decoding unit 62. In addition, the separation unit 61 decodes "PES packet header" in a PES packet from "TS packet payload" in the TS packet and separates it from the payload part. The separation unit 61 supplies "PES packet header" of the PES packet to an image signal decoding unit 63 as the encoded bit string b2.

The control signal decoding unit 62 decodes the encoded bit string b1, created based on the data structure shown in FIG. 18, to generate the control signals CTL1-CTL3. The image signal decoding unit 63 decodes the encoded bit string b2 to generate the non-3D image signal a.

The transmission method described above is applicable to broadcasting, communication, and downloading. The encoding method of the control signals CTL1-CTL3 is not limited to the method described above but the control signals CTL1-CTL3 may also be coded as metadata described by MPEG-7. The stream of encoded data may be either fixed-rate bit stream data or variable-rate bit stream data.

When an encoded stream is recorded on disk, the CAV (Constant Angular Velocity) method or CLV (Constant Linear Velocity) method may be used. The CAV method, which has efficient random accessibility, is suitable for finely modifying control signals that are once created. The CLV method is suitable for increasing the recording density.

An encoded stream may include not only the control signals CTL1-CTL3 and the non-3D image signal a but also monaural or stereo multi-channel audio data (audio signals). For example, the audio signal information may be allocated in "TS packet payload" shown in FIG. 14. FIG. 19 is a diagram showing the channel allocation of the audio signals of a predetermined sample that is stored in a packet in access units. For example, a monaural audio signal is allocated to the channel allocation information 000, a 2-channel audio signal to 001, a 4-channel audio signal to 010, a 6-channel audio signal to 011, an 8-channel audio signal to 100, a 16-channel audio signal to 101, and a 32-channel audio signal to 110.

It should be understood that many modifications and adaptations of the invention will become apparent to those skilled in the art and it is intended to encompass such obvious modifications and changes in the scope of the claims appended hereto.

What is claimed is:

1. A pseudo 3D image generation device comprising:
   basic depth model generation units that generate a plurality of basic depth models having basic scenes used for generating a pseudo 3D image signal;
   a combination unit that combines the plurality of basic depth models for generating a composite depth model based on a first control signal indicating composite percentages for combining the plurality of basic depth models;
   a weighting unit that multiplies a non-3D image signal by a weighting coefficient based on a second control signal indicating the weighting coefficient for putting a weight on the non-3D image signal;
   a depth estimation data generation unit that generates depth estimation data from the multiplied non-3D image signal and the composite depth models;
   a texture shift unit that shifts a texture of a non-3D image based on the depth estimation data and a third control signal including a parameter indicating a depth and a parameter indicating a convergence, for generating the pseudo 3D image signal; and
   first to third determination units that determine whether the first to third control signals are present,
   wherein if the first determination unit determines that the first control signal is not present, the combination unit generates the composite depth model based on pre-set composite percentages,
   if the second determination unit determines that the second control signal is not present, the weighting unit puts a weight on the non-3D image signal based on a pre-set weighting coefficient, and
   if the third determination unit determines that the third control signal is not present, the texture shift unit generates the pseudo 3D image signal based on pre-set values indicating a depth and a convergence.

* * * * *